(12) United States Patent
Wu

(10) Patent No.: US 11,281,688 B2
(45) Date of Patent: Mar. 22, 2022

(54) RANKING AND DE-RANKING DATA STRINGS

(71) Applicant: MICRO FOCUS LLC, Santa Clara, CA (US)

(72) Inventor: Thomas Wu, Cupertino, CA (US)

(73) Assignee: Micro Focus LLC, Santa Clara, CA (US)

(\*) Notice: Subject to any disclaimer, the term of this patent is extended or adjusted under 35 U.S.C. 154(b) by 92 days.

(21) Appl. No.: 16/787,953

(22) Filed: Feb. 11, 2020

(65) Prior Publication Data

US 2021/0248154 A1 Aug. 12, 2021

(51) Int. Cl.
*G06F 16/25* (2019.01)
*G06F 40/143* (2020.01)
*G06F 16/2457* (2019.01)
*G06F 16/22* (2019.01)
*G09C 1/02* (2006.01)

(52) U.S. Cl.
CPC ........ *G06F 16/258* (2019.01); *G06F 16/2246* (2019.01); *G06F 16/24578* (2019.01); *G06F 40/143* (2020.01); *G09C 1/02* (2013.01)

(58) Field of Classification Search
CPC .......................... G06F 16/258; G06F 16/2246
See application file for complete search history.

(56) References Cited

U.S. PATENT DOCUMENTS

| | | | |
|---|---|---|---|
| 8,600,048 B1 | 12/2013 | Hansen et al. | |
| 8,805,877 B2 | 8/2014 | Krishnamurthy et al. | |
| 9,634,838 B2 | 4/2017 | Rozenberg et al. | |
| 2010/0328115 A1* | 12/2010 | Binnig | G06F 16/24561 341/51 |

OTHER PUBLICATIONS

Format-Transforming Encryption: More than Meets the DPI; Kevin P. Dyer, et al.; 18 pages.
(Continued)

*Primary Examiner* — Hau H Hoang

(57) ABSTRACT

This document describes example methods, devices, and computing systems to rank a data string into a ranking value, and de-rank a second value representative of a variation of the ranking value (e.g., cipher value) into a second data string (e.g., cipher string), using a tree data-structure. The tree data-structure defines a domain of values representative of all variations of a set of characters that satisfy a format within which the data string is defined. The ranking value is identified with respect to a first offset value calculated for individual characters of the data string relative to the domain of values of the tree data-structure. The second value is de-ranked into a second data string of individual characters identified with respect to a second offset value calculated in the domain of values of the tree data-structure relative to the second value. This method may be performed using the tree data-structure to rank a data string into a ranking value, and de-rank a cipher version of the ranking value into a cipher string. Similarly, this method may be performed to accomplish the reverse process of ranking a cipher string to a ranking value, and de-ranking a decrypted version of the ranking value to a decrypted data string.

20 Claims, 7 Drawing Sheets

(56) References Cited

OTHER PUBLICATIONS

LibFTE: A Toolkit for Constructing Practical, Format-Abiding Encryption Schemes; Daniel Luchaup, et al.; 16 pages; Aug. 20-22, 2014.
Practical Solutions for Format-Preserving Encryption; Mor Weiss, et al.; 10 pages; 2015.
Protocol Misidentification Made Easy with Format-Transforming Encryption; Kevin P. Dyer, et al.; 13 pages; 2012.

* cited by examiner

RANKING AND DE-RANKING DATA STRINGS

BACKGROUND

In cryptography, format-preserving encryption (FPE) refers to encrypting in a way that the output (the ciphertext) is in the same format as the input (the plaintext). FPE requires the input data to be converted into an ordinal ranking value to be encrypted. The encrypted value is then de-ranked into ciphertext, in the same format as the plaintext. This ranking and de-ranking process works with pre-defined data formats, as exemplified by credit card numbers or social security numbers, because the data is already ordinal and naturally ranked. But the ranking and de-ranking process is more complicated in computer applications for variable data formats, such as strings including numbers and characters, or strings of varying lengths. A ranking and de-ranking process for different data formats may require each format to be hard-coded into a computing application.

DETAILED DESCRIPTION

Figure 1:
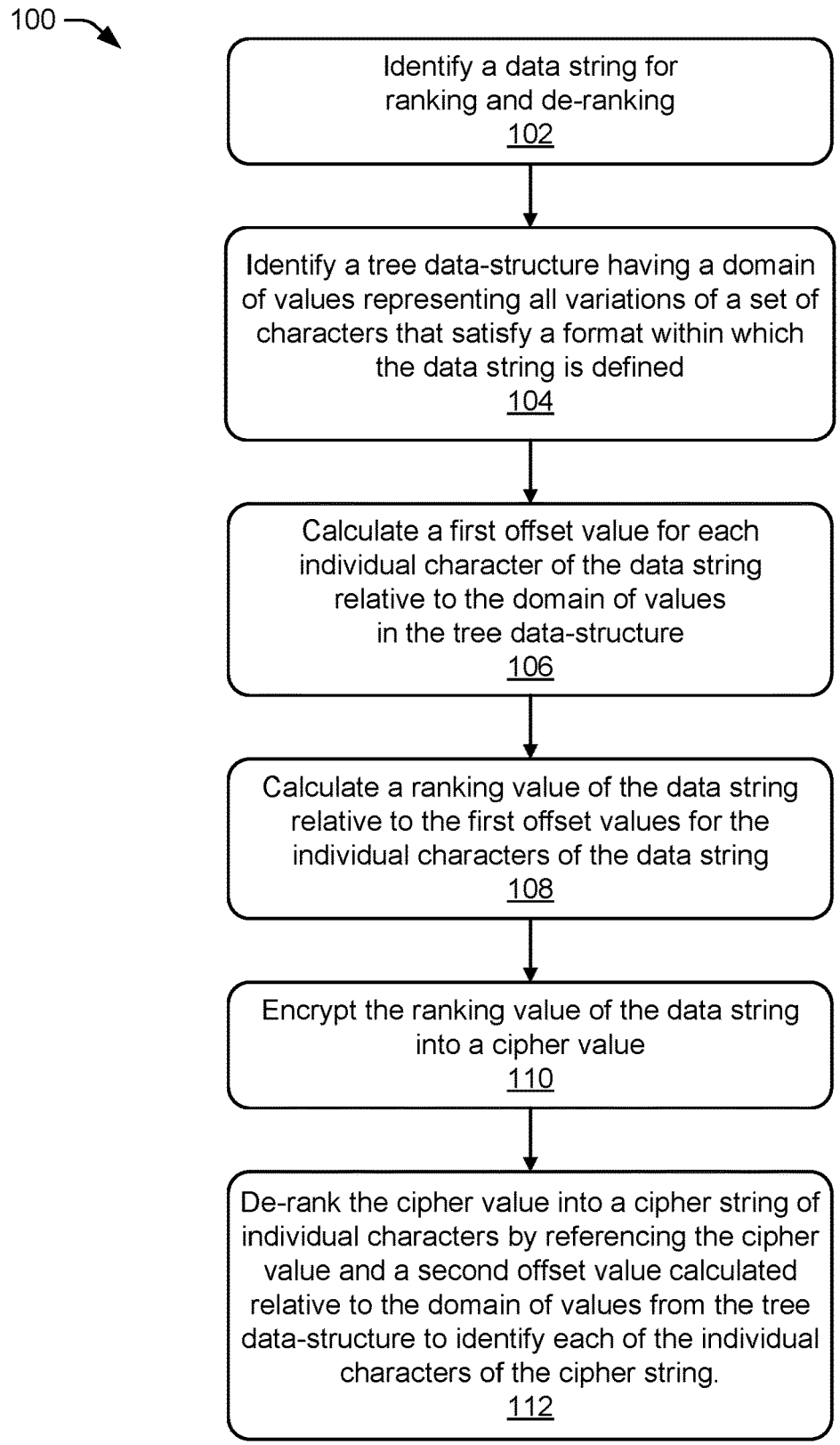
FIG. 1 is a flow chart illustrating an example method of ranking and de-ranking a data string using a tree data-structure.

This document describes example methods, devices, and computing systems to rank a data string into a ranking value, and de-rank a cipher value, representative of an encrypted version of the ranking value, into a cipher string, using a tree data-structure. This ranking and de-ranking using the tree data-structure works well for format-preserving encryption (FPE) purposes. The tree data-structure defines domain values representative of variations of a set of characters that satisfy a format within which the data string is defined. The data string is processed relative to the tree data-structure and converted to a ranking value based on offset values, relative to the domain values, for each character of the data string. The resulting ranking value is FPE encrypted to generate a cipher value. The cipher value is then processed using the tree data-structure and, based on offset values calculated relative to the domain values, the cipher value is de-ranked into a cipher string that is an FPE cipher of the data string.

This process may also be reversed using the tree data-structure, such that the data string is an encrypted cipher string processed relative to the tree data-structure and ranked to an encrypted cipher ranking value based on offset values, relative to the domain values, for each character of the cipher string. The resulting cipher ranking value is then decrypted to generate a decrypted value. The decrypted value is then processed using the tree data-structure and, based on offset values calculated relative to the domain values, the decrypted value is de-ranked into a decrypted data string relative to the cipher string.

This ranking and de-ranking, using the tree data-structure and offset values, provides flexibility for users to define their own data formats, such as may be achieved by a regular expression (a sequence of characters that define a search pattern, e.g., also known as regex). This enables the encryption and protection of data in various easily defined formats.

In one aspect, the tree data-structure may be generated using a modified regular expression library that forms the tree data-structure for regular expressions generated from the library. Alternatively, an intermediary compilation process may occur to generate the tree data-structure for a given regular expression or other defined string or format of characters. In other aspects, the tree data-structure may be manually defined, received from a data file, or received responsive to user input. Upon execution of the regular expression or receipt of the data string, the tree data-structure internal representation provides the ability to rank and de-rank the data string that conforms to the regular expression or data string format. The tree data-structure enables data strings (that satisfy the defined format, e.g., as defined by the regular expression) to be converted into their ordinal ranking value within the set of all strings defined by the format or regular expression. The tree data-structure also enables the reverse process to occur for de-ranking the ranking value into a cipher string. Representing regular expressions (or format defined strings) in an intermediate form of a tree data-structure, allows input data strings to be ranked and de-ranked efficiently while the overhead of processing and compiling the regular expression library or defined format occurs only once.

The system and/or operations of methods described in this disclosure may be embodied in whole or in part as programming instructions, such as firmware or software, stored on a non-transitory, machine-readable (e.g., computer/processor-readable) medium, such as a random-access memory (RAM), read-only memory (ROM), flash memory, cache memory, solid-state drive (SSD), hard disk drive (HDD), or combinations thereof, for execution on a processor in a computing system, device, or devices. In some examples, implementing the operations of these methods may be achieved by a processor reading and executing the programming instructions stored in the memory. In other examples, implementing the operations of the methods may be achieved using an application-specific integrated circuit (ASIC), such as a system-on-chip (SOC), and/or other hardware components either alone or in combination with programming instructions executable by a processor in a computing system or device.

The example methods described in this disclosure may include more than one implementation, and different implementations may not employ every operation presented in a respective flow diagram, or may employ additional steps not shown in the respective diagram. Therefore, while the operations of methods are presented in a particular order within the flow diagrams, the order of their presentations is not intended to be a limitation as to the order in which the operations may actually be implemented, or as to whether all of the operations may be implemented. For example, one implementation might be achieved through the performance of a number of initial operations, without performing one or more subsequent operations, while another implementation might be achieved through the performance of all of the operations.

FIG. 1 is a flow chart illustrating an example method 100 of ranking and de-ranking a data string using a tree data-structure. For this disclosure, a data string is a computer programming data type defining a sequence of characters. The data string may be implemented, for example, as an array data structure of bytes (or words) that stores a sequence of elements, e.g., characters, using character encoding such as Unicode or the American Standard Code for Information Interchange (ASCII). As an example, under the ASCII standard, the data string may include many different elements (characters) such as lowercase letters a-z, uppercase letters A-Z, digits 0-9, punctuation symbols, mathematical symbols, etc. At 102, a data string is identified for ranking and de-ranking for format preserving encryption. The data string is defined within the format of any regular expression or other pre-defined format from which the tree data-structure is defined. At 104, the tree data-structure is identified having a domain of values representing all the variations of a set of characters that satisfy the format within which the data string is defined. For example, if a regular expression defines a format to identify data strings of all license plate numbers for a given state, then the domain of values in the tree data-structure would represent all variations of those license plate numbers that satisfy the defined format.

At 106, a first offset value is calculated for each individual character of the data string relative to the domain of values in the tree-data-structure. This first offset value is indicative of one or more calculations occurring relative to each of the individual characters of the data string. At 108, a ranking value of the data string is calculated relative to the first offset value calculated for each of the individual character of the data string. At 110, the ranking value of the data string is encrypted into a cipher value.

At 112, the cipher value is de-ranked into a cipher string of individual characters. This is accomplished by referencing the cipher value and a second offset value calculated relative to the domain of values from the tree data-structure to identify each of the individual characters of the cipher string. This second offset value is also indicative of one or more calculations relative to the domain of values for identifying each of the individual characters in the cipher string. The resulting cipher string is a format preserving encryption cipher string representative of the data string.

Figure 2:
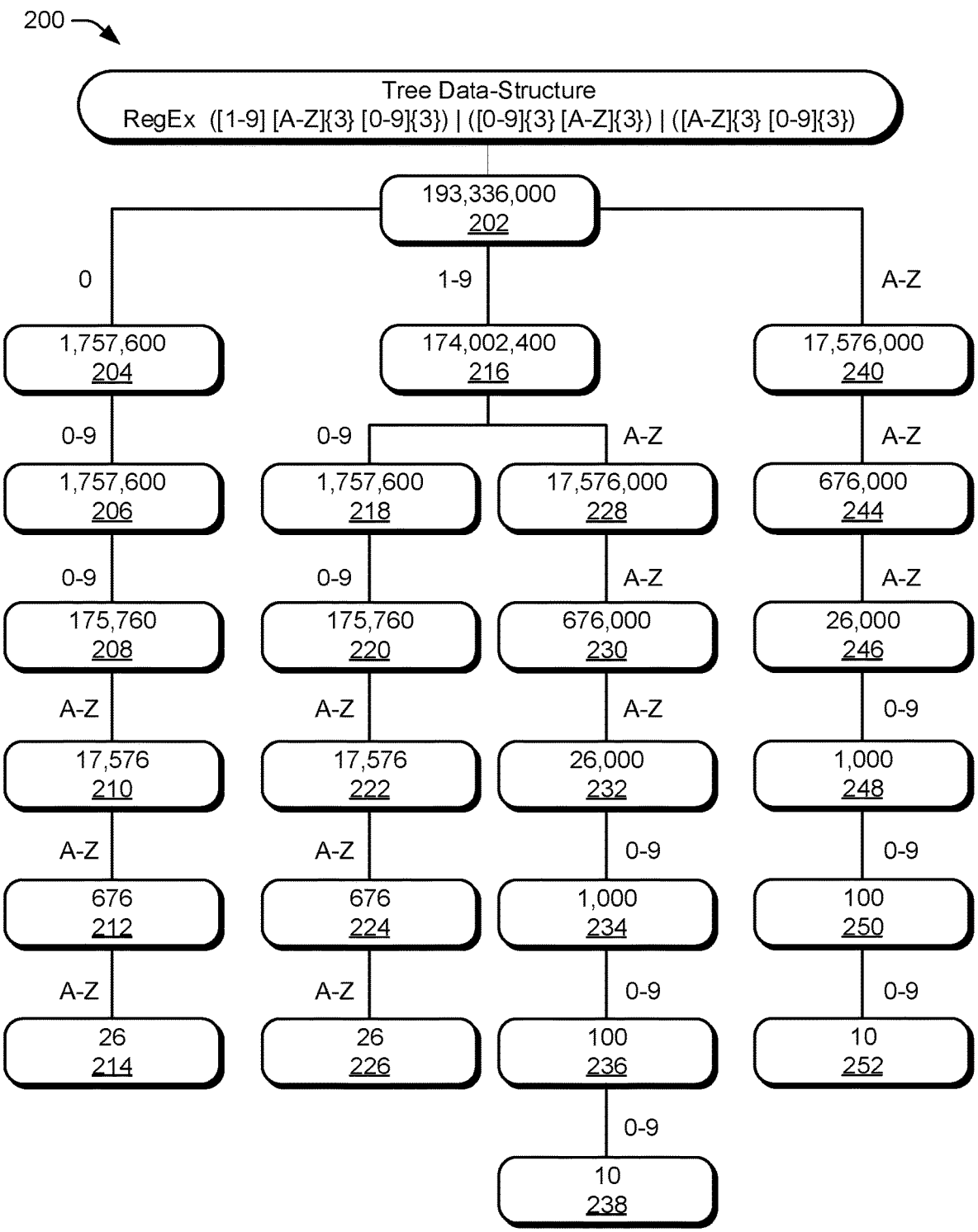
FIG. 2 is a block diagram of an example tree data-structure for ranking and de-ranking a data string that satisfies a format defined by an example regular expression.

FIG. 2 is a block diagram of an example tree data-structure 200 for ranking and de-ranking a data string. This tree data-structure depicts an example domain that satisfies a character format defined by the following regular expression labeled (1):

$$([1\text{-}9][A\text{-}Z]\{3\})|([0\text{-}9]\{3\})|([0\text{-}9]\{3\}[A\text{-}Z]\{3\})|([A\text{-}Z]\{3\}[0\text{-}9]\{3\}) \quad (1)$$

This regular expression (1) is simply an example for discussion purposes in this disclosure. Other regular expressions, and respective tree data-structures that reflect domains that satisfy all variations of characters defined by those regular expressions, may similarly be used. For this discussion, this example regular expression (1) matches all license plates that comply with formats identified as follows:
1. The format "1ABC123"
2. The format "123ABC"
3. The format "ABC123"

This regular expression (1) matches the union of all three license plate formats, and takes into account the no-leading zeroes rule of format #1. However, as mentioned, other regular expressions and respectively defined tree data-structures may similarly be used, such as for passport numbers, tracking numbers, serial numbers, or other identifiers that have a pre-determined data string format.

The tree data-structure 200 is organized in a priority order, by branches. In this example, the priority order is lexicographical following the ASCII character encoding format. For example, the first (left) branch depicts how the data string must start with the character zero (0) in order to meet the defined format and traverse the branch. The second (middle) branch depicts how the data string must start with any of the characters (e.g., numbers) one through nine (1-9) in order to meet the format and traverse the branch. And the third (right) branch depicts how the data string must start with any of the upper case characters A-Z in order to meet the format and traverse the branch. This allows for traversing the tree in a logical, priority order, quickly identifying whether a selected node matches a character in the data string relevant to the set of characters that satisfies the format within which the data string is defined. Although ASCII is used in this example, other character encoding formats may be used that follow a logical priority order to facilitate traversing the tree data-structure and efficiently identifying nodes relevant to data string characters being processed.

As depicted by the tree data-structure 200 at the root node 202, the domain of values representative of all variations of the set of characters that satisfy the character format defined by the regular expression (1) totals 193,336,000 (depicted as the node value of the node 202). Three branches stem from the root node 202, each depicting a subdomain of values representative of a subset of the variations of the set of characters that satisfy the character format within which the data string is defined (e.g., defined by the regular expression (1)). The first (left) branch, at node 204, identifies a node value indicating that there are 1,757,600 subdomain values representative of the number of variations of the set of characters that start with the character (number) zero (0) and also satisfy the character format defined by the regular expression (1). The second (middle) branch, at node 216, identifies a node value indicating that there are 174,002,400 subdomain values representative of the number of variations of the set of characters that start with any character of one through nine (1-9) and satisfy the character format defined by the regular expression (1). The third (right) branch, at node 240, identifies a node value indicating that there are 17,576,000 subdomain values representative of the number of variations of the set of characters that start with a letter A through Z (A-Z) and satisfy the character format defined by the regular expression (1).

Each domain, subdomain, domain of values, or subdomain of values, depicted at each node in the tree data-structure, is referred to interchangeably in this disclosure as a node, node value, domain, domain value, subdomain, or subdomain value, and the words domain and subdomain are used interchangeably. For example, a parent node may define a domain of values, and its child node may define a subdomain of values, but the child node subdomain of values may also be referred to as a node, domain, or domain of values when considered in its own context.

Now following the first (left) branch from node 204, the node 206 identifies a node value (domain value) of 1,757, 600 representative of the number of variations of the five remaining characters in the data string that start with a character of zero through nine (0-9) and satisfy the character format defined by the regular expression (1). Similarly, each subsequent (child) node in this branch identifies a domain value for remaining sets of characters that satisfy the format for this branch. For example, node 208 identifies a node value of 175,760 representative of the number of variations of the four remaining characters that start with a character of zero through nine (0-9). Node 210 identifies a node value of 17,576 representative of the number of variations of the three remaining characters that start with a character A through Z (A-Z). Node 212 identifies anode value of 676 representative of the number of variations of the two remaining characters that start with a letter A through Z (A-Z). And node 214 identifies a node value of 26 representative of the number of variations of the last character selected from the letters A through Z (A-Z).

The second (middle) branch at node 216 splits into two branches defining two separate domain values. The middle-left branch, at node 218, identifies a node value of 1,757,600, representative of the next five characters, starting with the character zero through nine (0-9) and that satisfy the character format defined by the regular expression (1). The middle-right branch, at node 228, identifies a node value of 17,576,000, representative of the next six characters that start with letter A through Z (A-Z) and satisfy the character format defined by the regular expression (1). The middle-left branch at node 218 continues with subsequent (child) nodes 220, 222, 224, and 226, each identifying respective subdomain values representative of the remaining set of characters that satisfy the character format defined by the regular expression (1). The middle-right branch at node 228 continues with subsequent (child) nodes 230, 232, 234, 236, and 238, each identifying respective subdomain values representative of the remaining set of characters that satisfy the character format defined by the regular expression (1).

Similarly, the third (right) branch at node 240 continues with subsequent (child) nodes 244, 246, 248, 250, and 252, each identifying respective subdomain node values representative of the remaining set of characters that satisfy the character format defined by the regular expression (1).

Figure 3:
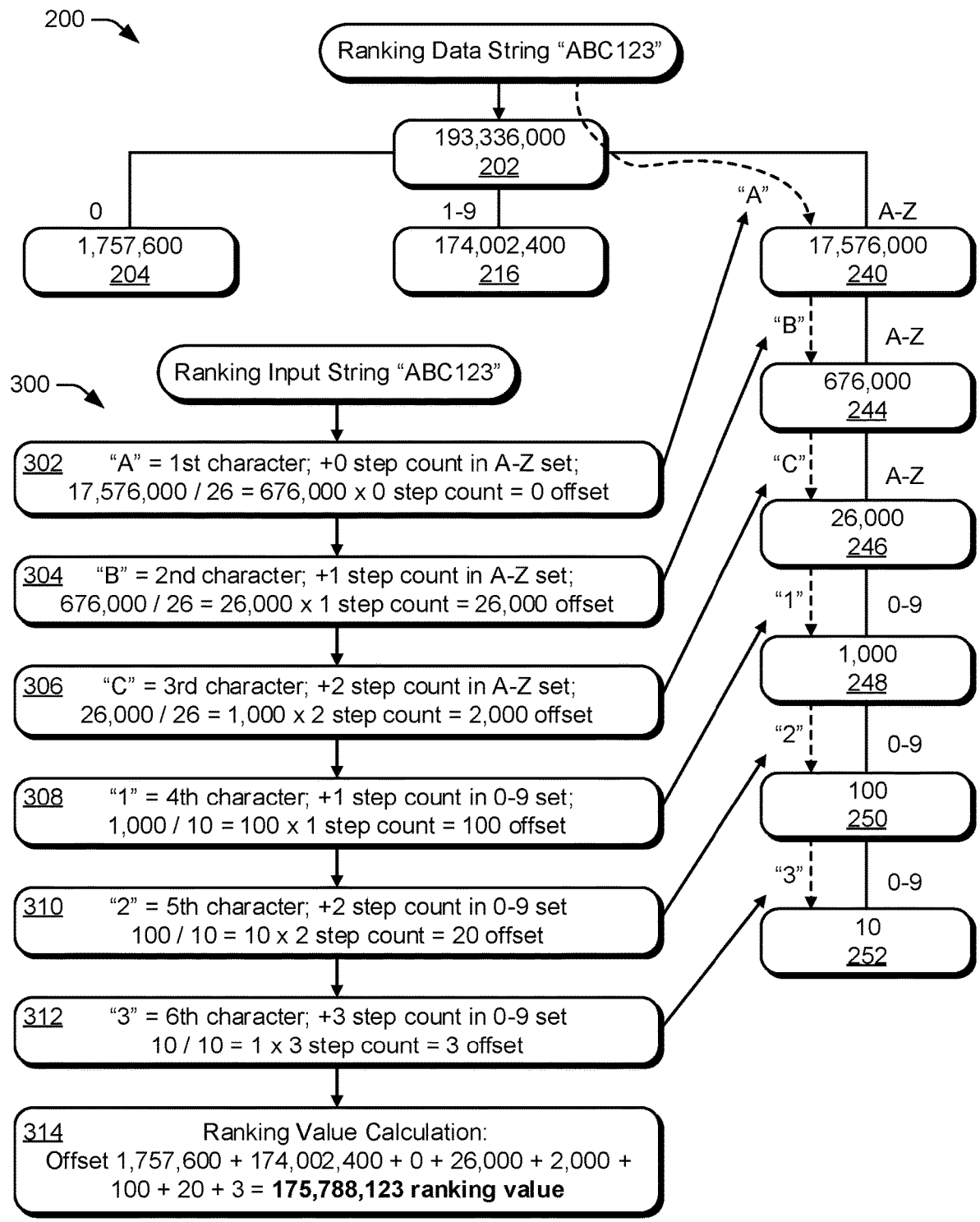
FIG. 3 is a combination block diagram and flow chart, the block diagram depicting a partial tree data-structure for a ranking example, and the flow chart illustrating an example method of ranking an example data string using the tree data-structure.

FIG. 3 is a combination block diagram 200 and flow chart 300. The block diagram depicts a portion of the tree data-structure 200 (from FIG. 2), including the third (right) branch, for illustrating an example ranking of a data string "ABC123" that satisfies the format defined by the regular expression (1). For simplicity of the diagram, and space limitations, the entire tree data-structure 200 is not shown. The flow chart 300 illustrates a method of ranking the example data string "ABC123" traversing the tree data-structure 200.

As referenced above the root node 202 in the tree data-structure 200, the example input data string "ABC123" comprises six individual characters. To process (traverse) through the tree data-structure for ranking purposes, the first character "A" is tested against the branches and nodes in a priority order to enable traversing the tree quickly and efficiently (e.g., lexicographical order following the ASCII character encoding format). Accordingly, because traversing the first (left) branch to node 204 indicates that the first character must be the character zero (0) to satisfy the format of that branch, and traversing the second (middle) branch to node 216 indicates that the first character must be a character from the set one through nine (1-9), it follows that the character "A" meets the format criteria of the third (right) branch traversing to node 240 because "A" satisfies the set of characters A-Z identified with node 240 of this branch. As such, the remaining individual characters of the data string will continue to follow this branch to identify a ranking value for the data string.

Following this third (right) branch to node 240, the ranking value of the data string "ABC123" is identified with respect to a first offset value calculated for individual characters (each individual character) of the data string relative to the domain of values of the tree data-structure. This first offset value is indicative of one or more calculations occurring relative to each individual character evaluated. Then, the offset value of each of the individual characters is summed up to identify the final ranking value of the data string, including with respect to any offset values of sibling nodes skipped (e.g., nodes 204, 216) when identifying node 240 as the branch to traverse. For clarity, the offset values calculated and referenced in the ranking process are labeled "first" offset values in this discussion simply to distinguish from subsequently identified offset values that will be defined as "second" offset values that are calculated and referenced relative to a de-ranking process described subsequently herein.

Referring now to the flow chart 300, at 302, the offset value of the character "A" from the data string "ABC123" is first determined by traversing to node 240 in the tree data-structure 200. A first calculation is to identify the step count of the letter "A" in the character count of the characters in the character set A-Z. The character count of the character set A-Z is twenty-six (26) because there are 26 characters in the set. Because "A" is the first character in the character set A-Z, the step count to get to the letter "A" within the set is zero (0). To clarify, to identify a step count for a character in a character set, the first character in the set is identified with a step count of zero, the second character in the set is identified with a step count of one, the third character in the set is identified with a step count of 2, and so forth. So for the character set A-Z, the step count of the character "A" is zero (0), the step count of the character "B" is one (1), the step count of the character "C" is two (2), and so forth through the character set, with the final step count of the character "Z" being twenty-five (25).

A next calculation is to divide the node value 17,576,000 (of node 240), by the character count of 26 to identify an intermediate offset value of 676,000. This intermediate offset value is then multiplied by the character "A" step count of zero (0) to identify the final offset value of the character "A", which is zero (0) in this instance. These calculations for identifying the offset value for the individual character "A" are summarized as follows:

For the character "A":
26=character count of character set A-Z
0=step count of character "A" in character count of character set
17,576,000=node value (node 240)
17,576,000/26=676,000 intermediate offset
676,000×0 step count=0 offset value for individual character "A"

Next, at 304, the offset value of the character "B" from the data string "ABC123" is determined by traversing to child node 244 in the tree data-structure 200. Again, the first calculation is to identify the step count of the letter "B" in the character count of the characters in the character set A-Z. Because "B" is the second character in the character set A-Z, the step count of "B" is one (1) within the set. The next calculation is to divide the current node value 676,000 (of node 244), by the character count of 26 to identify an intermediate offset value of 26,000. This intermediate offset value is then multiplied by the character "B" step count of one (1) to identify the final offset value of the character "B" which is 26,000. These calculations for identifying the offset value for the individual character "B" are summarized as follows:

For the character "B":
26=character count of character set A-Z
1=step count of character "B" in character count of character set
676,000=node value (node 244)
676,000/26=26,000 intermediate offset
26,000×1 step count=26,000 offset value for individual character "B"

At 306, the offset value of the character "C" from the data string "ABC123" is determined by traversing to child node 246 in the tree data-structure 200. The calculations for identifying the offset value for the individual character "C" are summarized as follows:

For the character "C":
26=character count of character set A-Z
2=step count of character "C" in character count of character set
26,000=node value (node 246)
26,000/26=1,000 intermediate offset
1,000×2 step count=2,000 offset value for individual character "C"

At 308, the offset value of the character "1" from the data string "ABC123" is determined by traversing to child node 248 in the tree data-structure 200. Again, the first calculation is to identify the step count of the character "1" in the character count of the characters in the character set 0-9. The character count of the character set 0-9 is ten (10) because there are ten characters in the set. Because "1" is the second character in the character set 0-9, the step count of the character "1" is one (1) within the set. Identifying a step count for a character in the character set 0-9 is similar to the discussion above for identifying a step count with respect to the character set A-Z. Namely, to identify a step count for a character in a character set, the first character in the set is identified with a step count of zero, the second character in the set is identified with a step count of one, the third character in the set is identified with a step count of 2, and so forth. So for the character set 0-9, the step count of the first character "0" in the set is zero (0), the step count of the second character "1" in the set is one (1), the step count of the third character "2" in the set is two (2), and so forth through the character set, with the final step count of the character "9" in the set being nine (9).

The next calculation is to divide the current node value 1,000 (of node 248), by the character count of 10 to identify an intermediate offset value of 100. This intermediate offset value is then multiplied by the character "1" step count of one (1) to identify the final offset value of the character "1" which is 100. These calculations for identifying the offset value for the individual character "1" are summarized as follows:

For the character "1":
10=character count of character set 0-9
1=step count of character "1" in character count of character set
1,000=node value (node 248)
1,000/10=100 intermediate offset
100×1 step count=100 offset value for individual character "1"

At 310, the offset value of the character "2" from the data string "ABC123" is determined by traversing to node 250 in the tree data-structure 200. The calculations for identifying the offset value for the individual character "2" are summarized as follows:

For the character "2":
10=character count of character set 0-9
2=step count of character "2" in character count of character set
100=node value (node 250)
100/10=10 intermediate offset
10×2 step count=20 offset value for individual character "2"

At 312, the offset value of the final character "3" from the data string "ABC123" is determined by traversing to node 252 in the tree data-structure 200. The calculations for identifying the offset value for the final individual character "3" are summarized as follows:

For the character "3":
10=character count of character set 0-9
3=step count of character "3" in character count of character set
10=node value (node 252)
10/10=1 intermediate offset
1×3 step count=3 offset value for individual character "3"

Now, at 314, the final ranking value of the data string "ABC123" is identified relative to the tree data-structure and the offset values calculated. This is accomplished by summing up all the individual character offset values identified, and adding in the offset value of the third (right) branch node 240 relative to the tree data-structure. In other words, the preceding sibling node values of the tree-data structure, referenced at a same level as node 240 in the priority order followed, that were skipped because the first character of the data string did not match that node character set at those nodes, are added in. In this example, the node value of 1,757,600 at node 204 for the first (left) branch, and the node value of 174,002,400 at node 216 for the second (middle) branch, were both skipped, so these offset values are added in. Skipped node values must be accounted for to identify a correct ranking value and avoid an incorrect ranking value relative to the entire tree data-structure and the entire domain within which the data string format is defined. For example, some ranks will have more than one input that reaches it, while others will have none. A proper ranking scheme must have an exact 1:1 correspondence between input data string and rank value. Accordingly, the final ranking value for the data string "ABC123" is calculated as follows:

1,757,600 (domain value of first (left) branch at node 204)
+174,002,400 (domain value of second (middle) branch at node 216)
+0 (offset of character "A")
+26,000 (offset of character "B")
+2,000 (offset of character "C")
+100 (offset of character "1")
+20 (offset of character "2)
+3 (offset of character "3")
175,788,123 (ranking value)

The ranking value of 175,788,123 may then be encrypted, using format preserving encryption for example, into a cipher value. This cipher value is then de-ranked using the tree data-structure 200 to identify a cipher string having individual cipher characters representative of the input data string "ABC123". The de-ranking occurs by identifying a "second" offset value relative to the cipher value and the domain of values (e.g., node values) of the tree data-structure. This second offset value again is indicative of one or more calculations occurring relative to the node values for identifying each individual character that is a cipher character of the individual characters in the input data string "ABC123".

Figure 4:
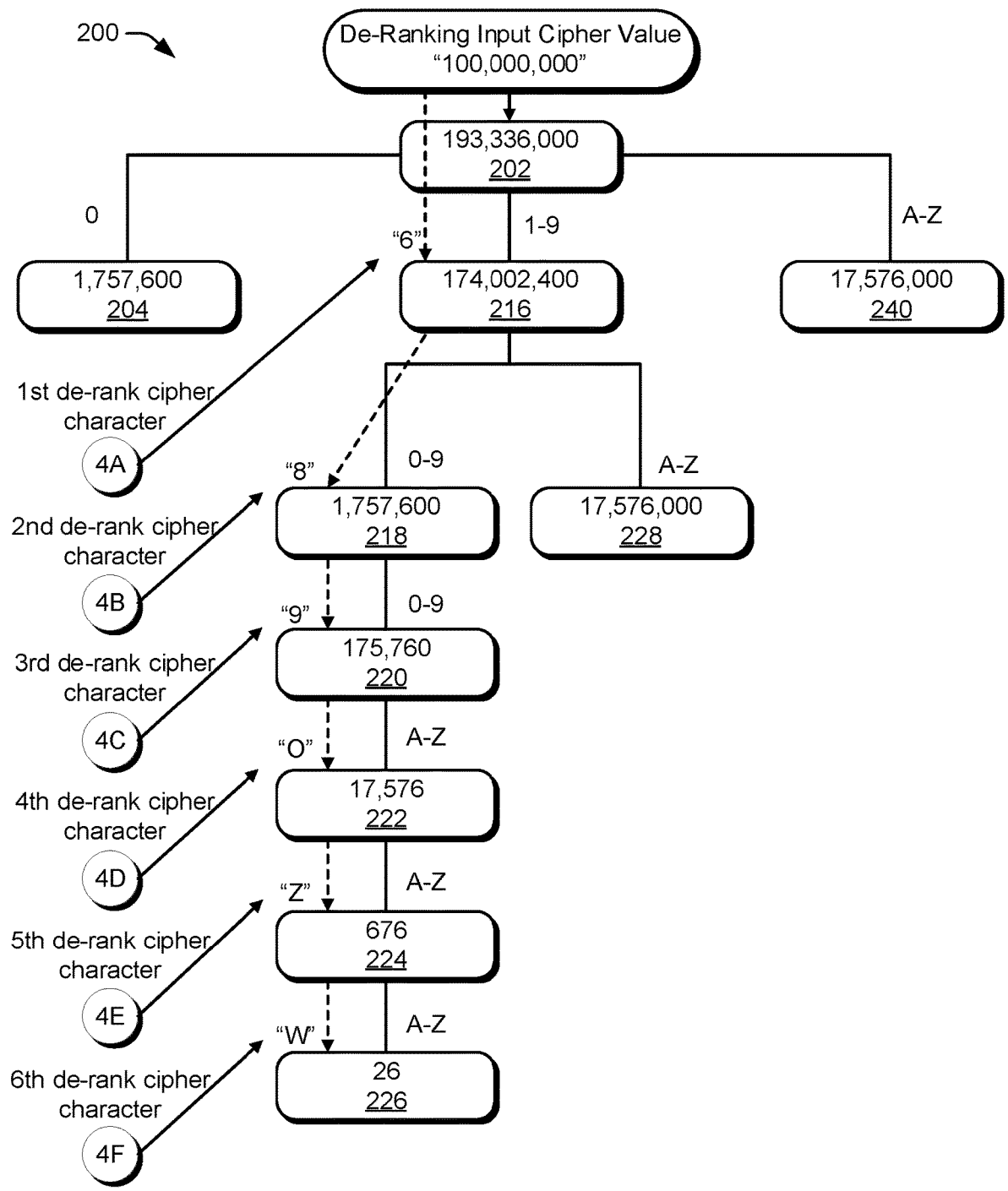
FIG. 4 is a block diagram of a partial tree data-structure for a de-ranking example, showing aspects for de-ranking an input cipher value into a cipher string.
Figure 5:
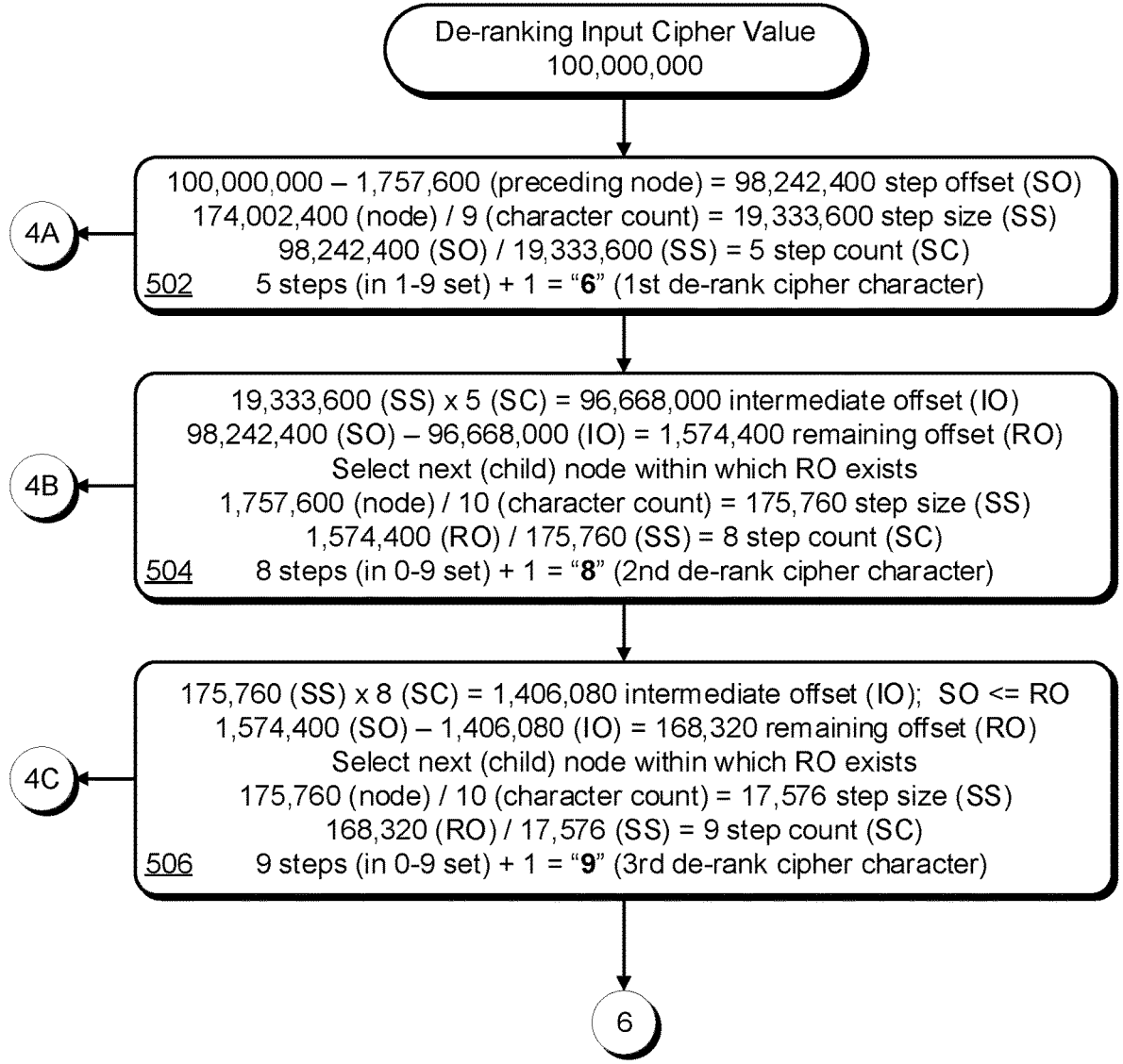
FIG. 5 is a flow chart illustrating a first sequence of steps of an example method of de-ranking a ranking value using the tree data-structure.
Figure 6:
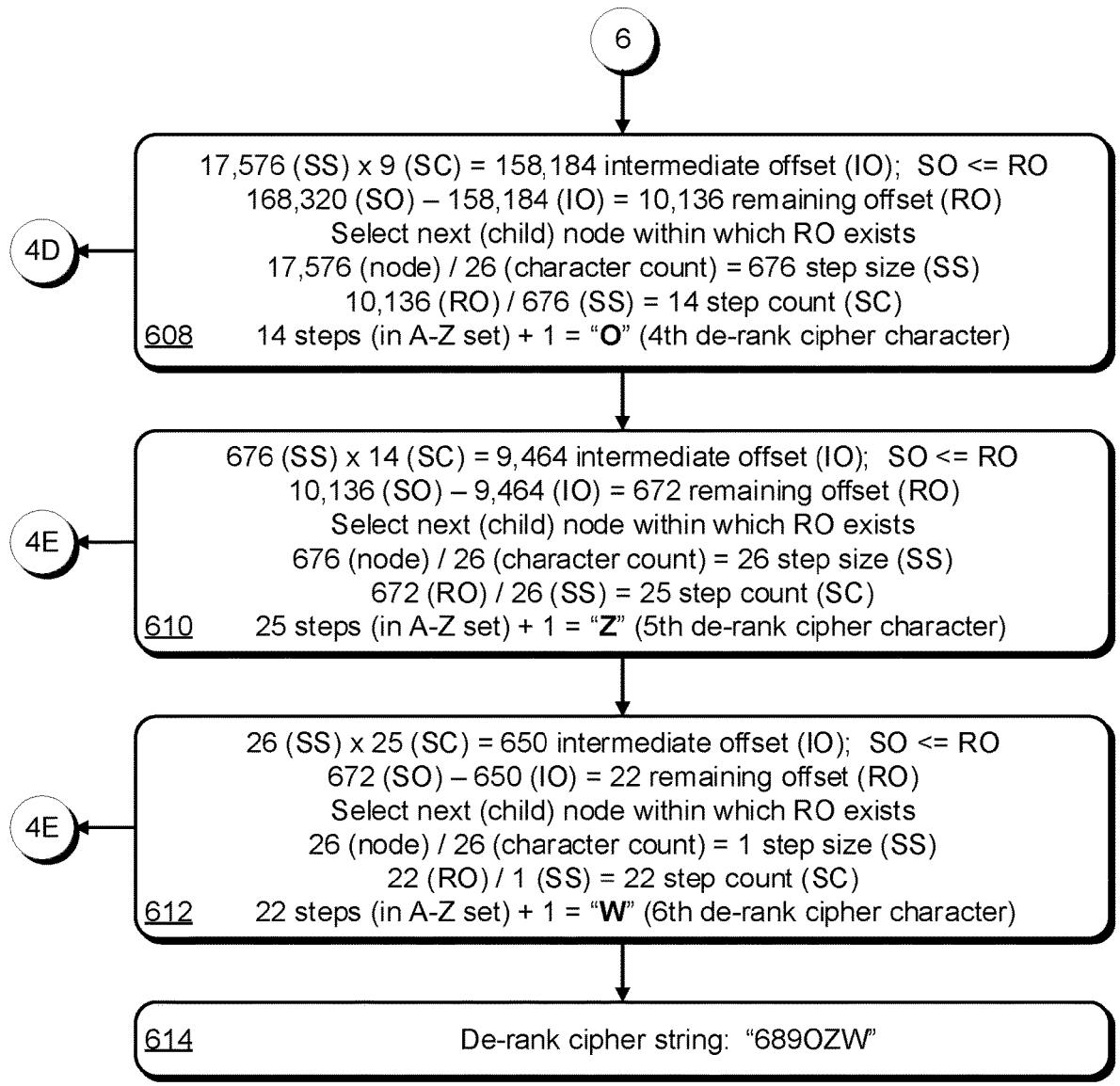
FIG. 6 is a flow chart illustrating a second sequence of steps of an example method of de-ranking a ranking value using the tree data-structure.

FIGS. 4-6 will now be discussed together for describing the de-ranking of a cipher value into a cipher string. FIG. 4 is a block diagram of a portion of the tree data-structure 200 (from FIG. 2) for a de-ranking example, showing aspects for de-ranking an input cipher value into a cipher string. This portion of the tree data-structure includes the middle-left branch of the second (middle) branch of the tree data-structure for illustrating an example de-ranking of a cipher value into a cipher string that satisfies the format defined by the regular expression (1) for format preserving encryption purposes. Again, for simplicity of the diagram, and space limitations, the entire tree data-structure 200 is not shown.

FIG. 5 is a flow chart 500 illustrating a first sequence of steps of an example method of de-ranking a ranking value as processed (traversed) through the tree data-structure 200. FIG. 6 is a flow chart 600 illustrating a second sequence of steps of an example method of de-ranking a ranking value as processed (traversed) through the tree data-structure 200. Methods and calculations for identifying offset values described in the flow charts 500 and 600 are depicted in reference to the tree data-structure 200 of FIG. 4 at 4A, 4B, 4C, 4D, 4E, and 4F.

Referring now to FIG. 4, as referenced above the root node 202 in the tree data-structure 200, the example de-ranking input cipher value is identified as 100,000,000. This is an arbitrary value chosen for simplicity of discussion purposes for identifying an example cipher string that is representative of a previously ranked six-character data string, using format preserving encryption string, such as the data string "ABC123". To process (traverse) through the tree data-structure for de-ranking purposes, the cipher value is tested against the branches, nodes and node values in a priority order to enable traversing the tree quickly and efficiently (e.g., lexicographical order following the ASCII character encoding format). As discussed above, the domain of values (node value) at a given node is representative of all variations of the set of characters that satisfy the character format defined by the regular expression (1) at that given node in the tree data-structure. As such, a first step is to identify within which domain (node value) does the cipher value exist (e.g., which node value is greater than the cipher value, relative to nodes traversed in a priority order) to identify individual cipher characters for de-ranking purposes.

Accordingly, traversing the first (left) branch to node 204, which has a node value of 1,757,600 representing the domain of variations of characters that begin with a zero (0) character and that satisfy a format within which the data string is defined, indicates that the domain (node value) of 1,757,600 of the node 204 is less than the cipher value of 100,000,000. This means that the cipher value of 100,000,000 is outside of (not in) the domain (node value) of 1,757,600 (e.g., the node value of node 204 does not comprise a value within which the cipher value exists). Therefore, the ability to de-rank the cipher value of 100,000,000 does not exist in the domain available at node 204. As such, the second (middle) branch is then traversed to node 216 where it is identified that the cipher value exists within (is less than) the node value of 174,002,400, meaning the ability to de-rank the cipher value exists in the domain of the node 216. The correct domain (node value) must be traversed to reflect the exact inverse of the ranking that previously occurred. Accordingly, the node 216 identifies where offset calculations begin for identifying individual characters from the cipher value that are cipher characters of the input data string.

Referring now to FIG. 5 as well as FIG. 4, method 500, at 502, any preceding sibling node values of the tree-data structure, referenced at a same level in the priority order followed, that were skipped because the cipher value was not in their referenced domain node value, are subtracted from the cipher value to identify a step offset value (SO). In this example at 502, only node 204 with the node value 1,757,600 precedes the current node 216 at the same sibling node level, so 1,757,600 (node value 204) is subtracted from the cipher value of 100,000,000 to identify a step offset value (SO) of 98,242,400. Then, the node value 174,002,400 of the current node 216 is divided by the character count of the character set associated with the node 216. In this instance, node 216 is associated with the character set 1-9, so the character count is 9. Therefore, 174,002,400 node value/9 character count=19,333,600 step size (SS). Next, the step offset 98,242,400 is divided by the step size 19,333,600 to identify a step count (SC) of 5. This means that five steps are counted in the character set to identify the first de-rank cipher character. In this instance, with the current character set 1-9, five steps, or in other words skipping five characters in the set (5+1), identifies the character "6" within the set. This is the first de-ranked cipher character for the cipher string.

These calculations for identifying the offset value for identifying the individual character "6" as the first character in the cipher string from the cipher value, are summarized as follows:

For the first cipher character in the cipher string:
100,000,000=input cipher value
1,757,600=preceding sibling node value
174,002,400=current node value (CN) (node 216)
9=character count (CC) of character set 1-9
100,000,000−1,757,600=98,242,400 step offset (SO)
174,002,400 (CN)/9 (CC)=19,333,600 step size (SS)
98,242,400 (SO)/19,333,600 (SS)=5 step count (SC)
5 SC+1=6, so sixth character in set is "6"
"6"=first de-rank cipher character in cipher string Now at 504, to identify the next offset and next de-rank cipher character, the already calculated step size 19,333,600 is multiplied by the already calculated step count of 5 to identify an intermediate offset (IO) of 96,668,000. This intermediate offset is subtracted from the already calculated step offset of 98,242,400 to identify a remaining offset (RO) of 1,574,400. This remaining offset is compared in the tree data structure to identify which next branch and node to follow. Because 1,574,400 exists within the domain (node value) of 1,757,600 at child node 218, the branch continuing with node 218 will be traversed.

Next, the current node value 1,757,600 (of node 218) is divided by the character count of the character set associated with the node 218. In this instance, node 218 is associated with the character set 0-9, so the character count is 10. Therefore, 1,757,600 node value/10 character count=175,760 step size (SS). The remaining offset 1,574,400 is divided by the step size 175,760 to identify a step count (SC) of 8. This means that eight steps are counted in the character set to identify the second de-rank cipher character in the cipher string. In this instance, with the current character set 0-9, eight steps, or in other words skipping eight characters in the set (8+1), identifies the character "8" within the set. This is the second de-ranked cipher character in the cipher stung.

These calculations for identifying the offset value for identifying the individual character "8" as the second character in the cipher string from the cipher value, are summarized as follows:

For the second cipher character in the cipher string:
1,757,600=current node value (node 218)
10=character count of character set "0-9"
19,333,600 (SS)×5 (SC)=96,668,000 intermediate offset (IO)
98,242,400 (SO)−96,668,000 (IO)=1,574,400 remaining offset (RO)
1,757,600 node value/10 character count=175,760 step size (SS)
1,574,400 (RO)/175,760 (SS)=8 step count (SC)
8 SC+1=9, so ninth character in set is "8"
"8"=second de-rank cipher character in cipher string At 506, to identify the next offset and next de-rank cipher character, the previously calculated step size 175,760 is multiplied by the previously calculated step count of 8 to identify an intermediate offset (IO) of 1,406,080. At this point, the previously calculated remaining offset is assigned to be the current step offset. So 1,574,400 is now the step offset (SO). The intermediate offset is subtracted from the newly assigned step offset of U.S. Pat. No. 1,574,400 to identify a remaining offset (RO) of 168,320. This remaining offset is compared in the tree data structure to identify which next branch and node to follow. Because 1,574,400 exists within the domain (node value) of 175,760 at child node 220, the tree is traversed to the next node 220. This node value of 175,760 is divided by the character count of the character set associated with the node 220. In this instance, node 220 is also associated with the character set 0-9, so the character count is 10. Therefore, 175,760 node value/10 character count=17,576 step size (SS). The remaining offset 168,320 is divided by the step size 17,576 to identify a step count (SC) of 9. This means that nine steps are counted in the character set to identify the third de-rank cipher character. In this instance, with the current character set 0-9, nine steps, or in other words skipping nine characters in the set (9+1), identifies the character "9" within the set. This is the third de-ranked cipher character in the cipher string.

These calculations for identifying the offset value for identifying the individual character "9" as the third character in the cipher string from the cipher value, are summarized as follows:

For the third cipher character in the cipher string:
175,760=current node value (node 220)
10=character count of character set 0-9
175,760 (SS)×8 (SC)=1,406,080 intermediate offset (IO)
Step offset (SO)=remaining offset (RO) 1,574,400
1,574,400 (SO)−1,406,080 (IO)=168,320 remaining offset (RO)
175,760 node value/10 character count=17,576 step size (SS)
168,320 (RO)/17,576 (SS)=9 step count (SC)
9 SC+1=10, so tenth character in set is "9"
"9"=third de-rank cipher character in cipher string Referring now to FIG. 6, method 600, at 608, to identify the next offset and next de-rank cipher character, the previously calculated step size 17,576 is multiplied by the previously calculated step count of 9 to identify an intermediate offset (IO) of 158,184. The previously calculated remaining offset is now again assigned to be the current step offset. So 168,320 is now the step offset (SO). The intermediate offset 158,184 is subtracted from the newly assigned step offset of 168,320 to identify a remaining offset (RO) of 10,136. Next, the tree is traversed to the next child node 222, having node value 17,576. This node value is divided by the character count of the character set associated with the node 222. In this instance, node 222 is associated with the character set A-Z, so the character count is 26. Therefore, 17,576 node value/26 character count=676 step size (SS). The remaining offset 10,136 is divided by the step size 676 to identify a step count (SC) of 14. This means that fourteen steps are counted in the character set to identify the fourth de-rank cipher character. In this instance, with the current character set A-Z, fourteen steps, or in other words skipping fourteen characters in the set (14+1), identifies the character "O" within the set. This is the fourth de-ranked cipher character in the cipher string.

These calculations for identifying the offset value for identifying the individual character "O" as the fourth character in the cipher string from the cipher value, are summarized as follows:

For the fourth cipher character in the cipher string:
17,576=current node value
26=character count of character set A-Z
17,576 (SS)×9 (SC)=158,184 intermediate offset (IO)
Step offset (SO)=remaining offset (RO) 168,320
168,320 (SO)−158,184 (IO)=10,136 remaining offset (RO)
17,576 node value/26 character count=676 step size (SS)
10,136 (RO)/676 (SS)=14 step count (SC)
14 SC+1=15, so $15^{th}$ character in set is "O"
"O"=fourth de-rank cipher character in cipher string At 610, to identify the next offset and next de-rank cipher character, the previously calculated step size 676 is multiplied by the previously calculated step count of 14 to identify an intermediate offset (IO) of 9,464. The previously calculated remaining offset is now again assigned to be the current step offset. So 10,136 is now the step offset (SO). The intermediate offset 9,464 is subtracted from the newly assigned step offset of 10,136 to identify a remaining offset (RO) of 672. Next, the tree is traversed to the next child node 224, having node value 676. This node value is divided by the character count of the character set associated with the node 224. In this instance, node 224 is also associated with the character set A-Z, so the character count is 26. Therefore, 676 node value/26 character count=26 step size (SS). The remaining offset 672 is divided by the step size 26 to identify a step count (SC) of 25. This means that 25 steps are counted in the character set to identify the fifth de-rank cipher character. In this instance, with the current character set A-Z, 25 steps, or in other words skipping 25 characters in the set (25+1), identifies the character "Z" within the set. This is the fifth de-ranked cipher character in the cipher string.

These calculations for identifying the offset value for identifying the individual character "Z" as the fifth character in the cipher string from the cipher value, are summarized as follows:

For the fifth cipher character in the cipher string:
676=current node value
26=character count of character set A-Z
676 (SS)×14 (SC)=9,464 intermediate offset (IO)
Step offset (SO)=remaining offset (RO) 10,136
10,136 (SO)−9,464 (IO)=672 remaining offset (RO)
676 node value/26 character count=26 step size (SS)
672 (RO)/26 (SS)=25 step count (SC)
25 SC+1=26, so $26^{th}$ character in set is "Z"
"Z"=fifth de-rank cipher character in cipher string At 612, to identify the next offset and next de-rank cipher character, the previously calculated step size 26 is multiplied by the previously calculated step count of 25 to identify an intermediate offset (IO) of 650. The previously calculated remaining offset is now again assigned to be the current step offset. So 672 is now the step offset (SO). The intermediate offset 650 is subtracted from the newly assigned step offset of 672 to identify a remaining offset (RO) of 22. Next, the tree is traversed to the next child node 226, having node value 26. This node value is divided by the character count of the character set associated with the node 226. In this instance, node 226 is also associated with the character set A-Z, so the character count is 26. Therefore, 26 node value/26 character count=1 step size (SS). The remaining offset 22 is divided by the step size 1 to identify a step count (SC) of 22. This means that 22 steps are counted in the character set to identify the sixth de-rank cipher character. In this instance, with the current character set A-Z, 22 steps, or in other words skipping 22 characters in the set (22+1), identifies the character "W" within the set. This is the sixth de-ranked cipher character in the cipher string.

These calculations for identifying the offset value for identifying the individual character "W" as the sixth character in the cipher string from the cipher value, are summarized as follows:

For the sixth cipher character in the cipher string:
26=current node value
26=character count of character set A-Z
26 (SS)×25 (SC)=650 intermediate offset (IO)
Step offset (SO)=remaining offset (RO) 672
672 (SO)−650 (IO)=22 remaining offset (RO)
26 node value/26 character count=1 step size (SS)
22 (RO)/1 (SS)=22 step count (SC)
22 SC+1=23, so 23rd character in set is "W"
"W"=sixth de-rank cipher character in cipher string At 614, the resulting de-ranking cipher string of "6890ZW" is shown. This cipher string comprises individual characters identified with respect to a second offset value calculated in the domain of values of the tree data-structure relative to the cipher value for each character.

Although the drawings and methods discussed have been described in the context of ranking a data string to a ranking value, encrypting the ranking value to a cipher value, and de-ranking the cipher value to a cipher string, these processes may also be reversed using the tree data-structure. In this context, the initial data string is an encrypted cipher string that is processed relative to the tree data-structure and ranked to an encrypted cipher ranking value based on offset values, relative to the domain values, for each character of the cipher string. The resulting cipher ranking value is then decrypted to generate a decrypted value. The decrypted value is then processed using the tree data-structure and, based on offset values calculated relative to the domain values, the decrypted value is de-ranked into a decrypted data string relative to the initial encrypted cipher string.

Figure 7:
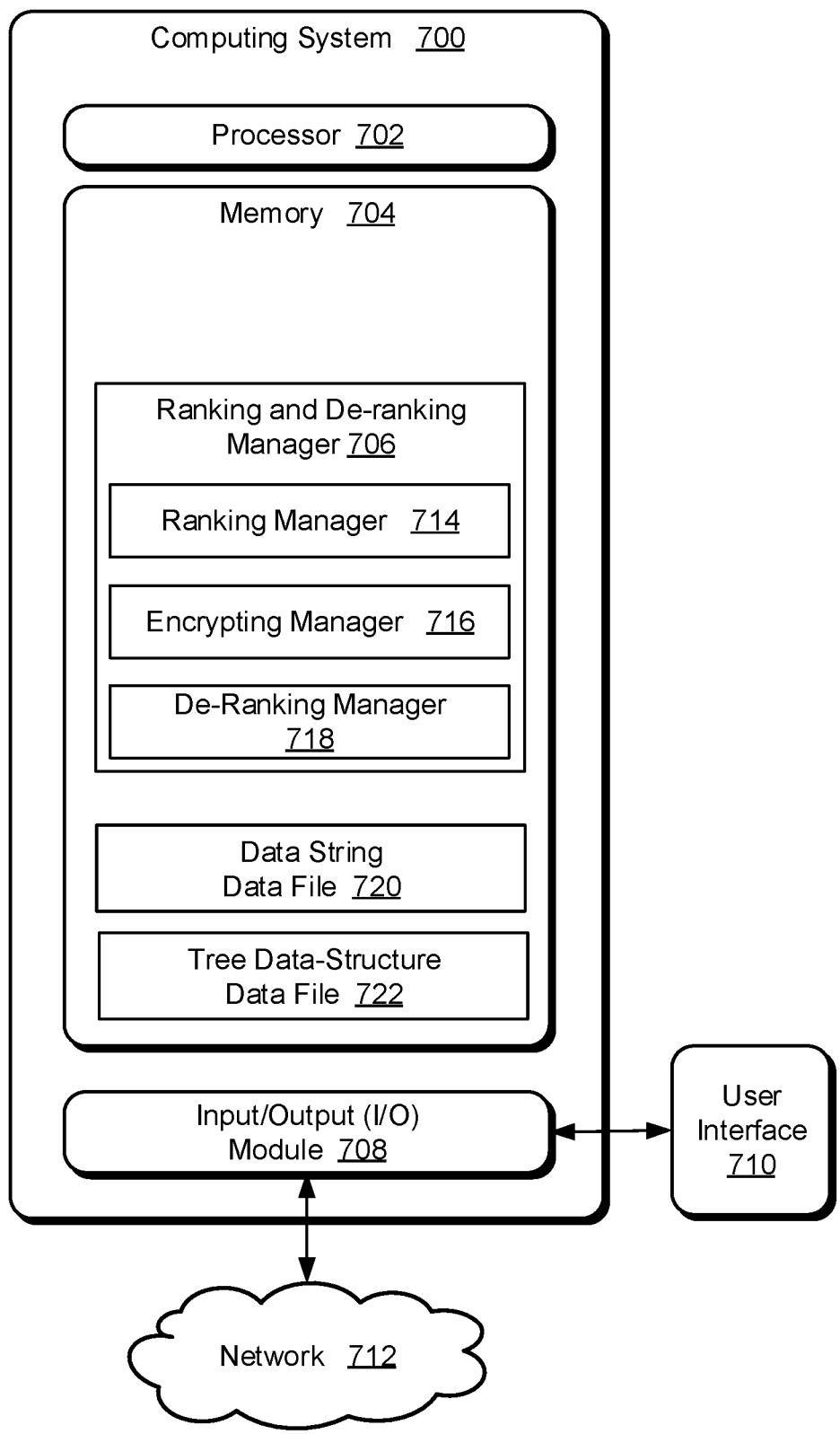
FIG. 7 is a block diagram illustrating an example computing system having a ranking and de-ranking manager using a tree data-structure.

FIG. 7 is a block diagram illustrating an example computing system 700 having a ranking and de-ranking manager using a tree data-structure as described in this disclosure. The computing system 700 includes a processor 702, a computer-readable media (memory) 704, a ranking and de-ranking manager 706, and an input/output (I/O) module 708. The computing system communicates with a user interface 710 and a network 712 by way of the I/O module 708. As some non-limiting examples, the computing system 700 may be a server, desktop computer, notebook computer, mobile device, handheld device, mobile phone, or similar computer device. The processor 702 may be any central processing unit (CPU), with one or more cores. The memory 704 may be any non-transitory, machine-readable (e.g., computer/processor-readable) medium, such as a RAM, ROM, cache, SSD, or a combination thereof, for storing program files, data, an operating system, and other executable instructions. The network 712 may be any local area network (LAN), wide area network (WAN), cloud, multi-cloud, hybrid cloud, or private on-premise cloud computing environment. The user interface 710 may be any display, monitor, screen, touch screen, keyboard, mouse, other input or output device, or any combination configuration of these devices to display information from the computing system to a user and allow the user to input information into the system.

The ranking and de-ranking manager 706 includes instructions residing in the memory 704 for ranking a data string to a ranking value, encrypting the ranking value to a cipher value, and de-ranking the cipher value to a cipher string. Similarly, ranking and de-ranking manager 706 may perform the reverse process. In this example, the ranking and de-ranking manager 706 is depicted simply as executable instructions, such as firmware or software, in the memory 704 for execution on the processor 702. However, the operations of the ranking and de-ranking manager 706 may be implemented in whole or in part using an ASIC, such as a system-on-a-chip (SoC), and/or other hardware components either alone or in combination with programming instructions executable by the processor.

The ranking and de-ranking manager 706 includes separate manager-modules including a ranking manager 714, an optional encrypting (and decrypting) manager 716, and a de-ranking manager 718. These manager-modules are shown separately for discussion purposes, but may be combined, or further separated into additional modules, according to design preference. Ranking manager 714 ranks a data string (e.g., for format-preserving encryption) using a tree data-structure according to the example methods previously described. The data string may be defined within the format of any regular expression or other pre-defined format for which the tree data-structure is defined. The data string may be input into the ranking manager 714 via the user interface 710, or received from a data file 720. The data file 720 may be generated manually through the user interface 710, or received through the network 712 via the I/O module 708.

The tree data-structure may be generated by modifying a regular expression library such that the tree data-structure is formed for regular expressions generated from the library. Alternatively the tree data-structure may be manually defined, received from data file 725, or received responsive to user input through the user interface 710. Any of these methods will suffice, provided the tree data-structure satisfies the format defined by the regular expression or other pre-defined format within which the data string is defined. The tree data-structure is identified having a domain of values representing all the variations of a set of characters that satisfy the format within which the data string is defined.

Ranking manager 714 ranks a data string by calculating a first offset value for individual characters of the data string relative to the domain of values in the tree data-structure, to produce a resulting ranking value. This first offset value is indicative of one or more calculations occurring relative to each of the individual characters of the data string. The ranking value of the data string is calculated relative to the offset value calculated for each of the individual characters of the data string.

The encrypting manager 716 encrypts the ranking value, generated from the data string by the ranking manager 714, to a cipher value. Alternatively, the encrypting manager 716 may decrypt the ranking value if the reverse process is being performed. The encrypting manager 716 is an optional component of the ranking and de-ranking manager 706 because the process of encrypting or decrypting, e.g., using format preserving encryption in this example, may occur separately from, or may occur by using a separate encryption/decryption program unrelated to the ranking and de-ranking manager 706. In this context, whatever program or function is used to generate the cipher value from the ranking value, the cipher value is de-ranked into a cipher string of individual characters by de-ranking manager 718. Or, the reverse may be performed of decrypting the cipher value into a decrypted value for de-ranking. From the perspective of de-ranking the cipher value, this is accomplished by referencing the ciphervalue and a second offset value calculated relative to the domain of values from the tree data-structure to identify each of the individual characters of the cipher string. This second offset value is also indicative of one or more calculations occurring relative to the domain of values for identifying each of the individual characters in the resulting cipher string. The resulting cipher string is a format preserving encryption cipher string representative of the data string. The details of this process are described previously with respect to the example methods discussed.

Although not depicted, it is understood that the ranking and de-ranking manager 706, and/or one or more of the individual manager-modules 714, 716, and 718, may be implemented in a distributed network environment via the network 712. For example, a separate computing system or device, having basic computing constructs such as a processor and memory, communicating via the network 712, may deploy a separate copy or instance of the ranking and de-ranking manager 706, and/or one or more of the manager-modules. In this context, as an example, the computing system 700, and the ranking and de-ranking manager 706, may perform the ranking functionality, but may optionally pass the ranking value over the network to the separate computing system to perform the de-ranking functionality there, or vice-versa, provided the tree data-structure is also available in the distributed environment for the ranking and de-ranking functionality.

While this disclosure has been described with respect to example embodiments outlined above, it is evident that alternatives, modifications and variations will be apparent to those skilled in the art. Accordingly, the described and depicted examples of the present disclosure are intended to be illustrative, not limiting, and the subject of the appended claims is not necessarily limited to the specific features or methods described herein.

What is claimed is:

1. A method of ranking and de-ranking, comprising:
   ranking, by a computing device, a first data string into a first ranking value relative to a tree data-structure defining a domain of values of the tree data-structure representative of all variations of a set of characters that satisfy a format within which the first data string is defined, the first ranking value being identified with respect to a first offset value calculated for each individual character of the first data string relative to the domain of values of the tree data-structure,
   wherein the first data string includes more than one character and
   wherein the first ranking value is determined based on a sum of each of the first offset values for the more than one character and any skipped domain values of the tree data-structure; and
   de-ranking, by the computing device, a second value, representative of a variation of the first ranking value, into a second data string, the second data string comprising individual characters each identified with respect to a second offset value calculated in the domain of values of the tree data-structure relative to the second value.

2. The method of claim 1, wherein the first data string comprises a non-encrypted data string, the first ranking value comprises a non-encrypted ranking value, the second value comprises a cipher value, and the second data string comprises a cipher data string.

3. The method of claim 1, wherein the first data string comprises a cipher string, the first ranking value comprises a cipher ranking value, the second value comprises a decrypted value, and the second data string comprises a decrypted data string.

4. The method of claim 1, further comprising traversing branches and nodes in the tree data-structure, each node comprising a node value representative of a subdomain of the domain of values of the tree data-structure, the subdomain of the domain of values of the tree data-structure being representative of a subset of the variations of the set of characters that satisfies the format within which the first data string is defined.

5. The method of claim 4, wherein ranking the first data string into the first ranking value comprises referencing the node value to calculate the first offset value for each individual character of the first data string.

6. The method of claim 4, wherein ranking the first data string into the first ranking value comprises:
   a. selecting a character of the individual characters of the first data string;
   b. traversing the branches and nodes, in a priority order, and identifying a node value of a selected node within which the selected character of the individual characters is represented from the set of characters that satisfies the subset of the format within which the first data string is defined;
   c. calculating the first offset value of the selected character of the individual characters relative to the node value of the selected node;
   d. repeating steps a-c for each character of the individual characters of the first data string, until the first offset value is calculated for each character of the individual characters of the first data string; and
   e. referencing together the first offset value calculated for each of the characters of the individual characters of the first data string with a node value of any sibling nodes skipped in identifying the node value of the selected node, relative to the priority order.

7. The method of claim 4, wherein the first offset value for each individual character of the first data string is calculated comprising:
   identifying a selected node, of the nodes, comprising a node value within which a selected one of the individual characters of the first data string is represented;
   referencing the node value of the selected node to a character count to identify an intermediate offset, the character count representing a count of characters available in a character set within which the selected one of the individual characters exists that satisfies the format within which the first data string is defined at the selected node; and
   referencing the intermediate offset with a step count, the step count representing a relative reference position of the selected one of the individual characters within the character set.

8. The method of claim 1, wherein the second offset value is calculated for identifying the individual characters for the second data string, comprising:
 a. identifying a node in a branch of the tree data-structure, the node comprising a node value representative of a subdomain of the domain of values of the tree data-structures, the subdomain of the domain of values of the tree data-structures being representative of a subset of the variations of the set of characters that satisfies the format within which the first data string is defined, the node value comprising the second value;
 b. calculating the second offset value relative to at least one of (i) the second value, (ii) the node value, (iii) any sibling node values skipped in identifying the node, and (iv) a character count representing a count of characters available in a set of characters that satisfies the format within which the first data string is defined at the node;
 c. identifying a child node in the branch of the tree data-structure, the child node comprising a child node value representative of a subdomain of the domain of values of the tree data-structure; and
 d. repeating steps b-c for the child node and subsequent child nodes until the second offset value for each one of the second data string individual characters is identified.

9. The method of claim 4, wherein de-ranking the second value into the second data string comprises identifying a selected node, of the nodes, comprising the node value within which the second value exists, and identifying the second offset value relative to the node value for identifying a selected individual character of the second data string.

10. The method of claim 4, wherein the second offset value is calculated comprising at least one of:
 identifying a selected node, of the nodes, comprising the node value within which the second value exists;
 identifying a step offset indicative of the second value less a total of adding together a node value of any sibling nodes identified preceding the selected node, in a priority order, at a same level of the tree data-structure, wherein sibling nodes do not comprise the node value within which the second value exists;
 referencing the node value of the selected node with a character count to determine a step size, the character count representing a count of characters available in the set of characters that satisfies the format within which the first data string is defined at the selected node;
 referencing the step offset with the step size to determine a step count; and
 referencing the step count to identify a relative position within the character count for identifying one of the second data string individual characters.

11. The method of claim 10, wherein the second offset value is further calculated comprising:
 a. referencing the step size with the step count to determine an intermediate offset value;
 b. referencing the intermediate offset with the step offset to determine a remaining offset;
 c. identifying a child node within which the remaining offset exists;
 d. referencing the node value of the child node with a next character count to determine a next step size, the next character count representing a next count of characters available in the set of characters that satisfies the format within which the first data string is defined at the child node;
 e. referencing the remaining offset with the step size to determine a next step count;
 f. referencing the next step count to identify a relative position within the next character count for identifying a next one of the second data string individual characters;
 g. assigning the remaining offset to the step offset; and
 h. repeating steps a-g until each child node of the nodes, in a same branch as the selected node, is referenced and each one of the second data string individual characters is identified.

12. The method of claim 1, wherein the second offset value is calculated for identifying the individual characters of the second data string comprising:
 a. identifying a node in the tree-data structure, the node comprising a node value representative of a subdomain of the domain of values of the tree data-structure, the node value comprising a value within which the second value exists;
 b. identifying a step offset indicative of a reference location of the second value relative to the node value and the tree-data structure;
 c. determining a step size relative to the node value and a character count representing a count of characters available in the set of characters that satisfies the format within which the first data string is defined at the node;
 d. determining a step count relative to the step offset and the step size;
 e. referencing the step count to identify a relative position within the character count for identifying one of the second data string individual characters;
 f. determining an intermediate offset value relative to the step size and step count;
 g. determining a remaining offset relative to the intermediate offset and the step offset;
 h. identifying a child node;
 i. determining a next step size relative to a node value of the child node and a next character count, the next character count representing a next count of characters available in the set of characters that satisfies the format within which the first data string is defined at the child node;
 j. determining a next step count relative to the remaining offset and the step size;
 k. referencing the next step count to identify a relative position within the next character count for identifying a next one of the second data string individual characters;
 l. assigning the remaining offset to the step offset; and
 m. repeating steps f-l until each child node is referenced and each one of the second data string individual characters is identified.

13. A system for ranking and de-ranking, the system comprising:
 at least one processor; and
 a memory,
 the memory including instructions that when executed by the at least one processor cause the at least one processor to:
  rank a first data string into a first ranking value relative to a tree data-structure defining a domain of values of the tree data-structure representative of all variations of a set of characters that satisfy a format within which the first data string is defined, the first ranking value being identified with respect to a first offset value calculated for individual characters of the first data string relative to the domain of values of the tree data-structure, wherein the first data string includes more than one character and wherein the first ranking value is determined based on a sum of each of the first offset values for the more than one character and any skipped domain values of the tree data-structure; and de-rank a second value, representative of a variation of the first ranking value, into a second data string, the second data string comprising individual characters each identified with respect to a second offset value calculated in the domain of values of the tree data-structure relative to the second value.

14. The system of claim 13, wherein the tree data-structure comprises branches and nodes, each node comprising a node value representative of a subdomain of the domain of values of the tree data-structure, the subdomain of the domain of values of the tree data-structure being representative of a subset of the variations of the set of characters that satisfies the format within which the first data string is defined.

15. The system of claim 14, further comprising instructions that when executed by the at least one processor cause the at least one processor to rank the first data string into the first ranking value by causing the at least one processor to:
   a. select a character of the individual characters of the first data string;
   b. traverse the branches and nodes, in a priority order, and identify a node value of a selected node within which the selected character of the individual characters is represented from the set of characters that satisfies the subset of the format within which the first data string is defined;
   c. calculate the first offset value of the selected character of the individual characters relative to the node value of the selected node;
   d. repeat steps a-c for each character of the individual characters of the first data string, until the first offset value is calculated for each character of the individual characters of the first data string; and
   e. reference together the first offset value calculated for each of the characters of the individual characters of the first data string with a node value of any sibling nodes skipped in identifying the node value of the selected node, relative to the priority order.

16. The system of claim 14, further comprising instructions that when executed by the at least one processor cause the at least one processor to calculate the first offset value for individual characters of the first data string by causing the at least one processor to:
   identify a selected node, of the nodes, comprising the node value within which a selected one of the individual characters of the first data string is represented;
   reference the node value of the selected node to a character count to identify an intermediate offset, the character count representing a count of characters available in a character set within which the selected one of the individual characters exists that satisfies the format within which the first data string is defined at the selected node; and
   reference the intermediate offset with a step count to calculate the first offset value, the step count representing a relative reference position of the selected one of the individual characters within the character set.

17. The system of claim 13, further comprising instructions that when executed by the at least one processor cause the at least one processor to calculate the second offset value for individual characters of a cipher string by causing the at least one processor to:
   a. identify a node in a branch of the tree data-structure, the node comprising a node value representative of a subdomain of the domain of values of the tree data-structure, the subdomain of the domain of values of the tree data-structure being representative of a subset of the variations of the set of characters that satisfies the format within which the first data string is defined, the node value comprising the second value;
   b. calculate the second offset value relative to at least one of (i) the second value, (ii) the node value, (iii) any sibling node values skipped in identifying the node, and (iv) a character count representing a count of characters available in a set of characters that satisfies the format within which the first data string is defined at the node;
   c. identify a child node in the branch of the tree data-structure, the child node comprising a child node value representative of a subdomain of the domain of values of the tree data-structure; and
   d. repeat steps b-c for the child node and subsequent child nodes until the second offset value for each one of the second data string individual characters is identified.

18. The system of claim 14, further comprising instructions that when executed by the at least one processor cause the at least one processor to calculate the second offset value by causing the at least one processor to:
   identify a selected node, of the nodes, comprising the node value within which the second value exists;
   identify a step offset indicative of the second value less a total of adding together a node value of any sibling nodes identified preceding the selected node, in a priority order, at a same level of the tree data-structure, wherein sibling nodes do not comprise the node value within which the second value exists;
   reference the node value of the selected node with a character count to determine a step size, the character count representing a count of characters available in the set of characters that satisfies the format within which the first data string is defined at the selected node;
   reference the step offset with the step size to determine a step count; and
   reference the step count to identify a relative position within the character count for identifying one of the second data string individual characters.

19. The system of claim 13, further comprising instructions that when executed by the at least one processor cause the at least one processor to calculate the second offset value for identifying the individual characters of the second data string by causing the at least one processor to:
   a. identify a node in the tree data-structure, the node comprising a node value representative of a subdomain of the domain of values of the tree data-structure, the node value comprising a value within which the second value exists;
   b. identify a step offset indicative of a reference location of the second value relative to the node value and the tree-data structure;
   c. determine a step size relative to the node value and a character count representing a count of characters available in the set of characters that satisfies the format within which the first data string is defined at the node;
   d. determine a step count relative to the step offset and the step size;

e. reference the step count to identify a relative position within the character count for identifying one of the second data string individual characters;

f. determine an intermediate offset value relative to the step size and step count;

g. determine a remaining offset relative to the intermediate offset and the step offset;

h. identify a child node;

i. determine a next step size relative to a node value of the child node and a next character count, the next character count representing a next count of characters available in the set of characters that satisfies the format within which the first data string is defined at the child node;

j. determine a next step count relative to the remaining offset and the step size;

k. reference the next step count to identify a relative position within the next character count for identifying a next one of the second data string individual characters;

l. assign the remaining offset to the step offset; and m. repeat steps f-l until each child node is referenced and each one of the second data string individual characters is identified.

20. A non-transitory machine-readable storage medium storing instructions that when executed by at least one processor cause the at least one processor to:

rank a first data string into a first ranking value relative to a tree data-structure defining a domain of values of the tree data-structure representative of all variations of a set of characters that satisfy a format within which the first data string is defined, the first ranking value being identified with respect to a first offset value calculated for each individual character of the first data string relative to the domain of values of the tree data-structure, wherein the first data string includes more than one character and wherein the first ranking value is determined based on a sum of each of the first offset values for the more than one character and any skipped domain values of the tree data-structure; and de-rank a second value, representative of a variation of the first ranking value, into a second data string, the second data string comprising individual characters each identified with respect to a second offset value calculated in the domain of values of the tree data-structure relative to the second value.

\* \* \* \* \*